C. B. ARCHER.
SOLDERING IRON.
APPLICATION FILED OCT. 19, 1920.

1,400,784.

Patented Dec. 20, 1921.
2 SHEETS—SHEET 2.

C. B. Archer.
INVENTOR
BY Victor J. Evans
ATTORNEY

UNITED STATES PATENT OFFICE.

CHARLES B. ARCHER, OF CHAPMAN, ALABAMA, ASSIGNOR, BY MESNE ASSIGNMENTS, TO NORMAN F. McGOWIN, OF CHAPMAN, ALABAMA.

SOLDERING-IRON.

1,400,784. Specification of Letters Patent. Patented Dec. 20, 1921.

Application filed October 19, 1920. Serial No. 417,929.

*To all whom it may concern:*

Be it known that I, CHARLES B. ARCHER, a citizen of the United States, residing at Chapman, in the county of Butler and State of Alabama, have invented new and useful Improvements in Soldering-Irons, of which the following is a specification.

This invention relates to improvements in soldering irons and has for an object the provision of an iron which includes a solder reservoir or chamber with means for controlling the discharge of solder therefrom.

Another object is the provision of means for electrically heating the iron and melting the solder, so that the latter will flow through a valve controlled discharge opening in quantities desired.

A further object is the provision of means for providing the iron with a file, so that the parts to be soldered may be conveniently smooth when necessary, thus reducing the number of tools necessary for the workman to carry and facilitating the work of soldering.

With the above and other objects in view, the invention further includes the following novel features and details of construction, to be hereinafter more fully described, illustrated in the accompanying drawings and pointed out in the appended claim.

In the drawings:—

Fig. 3 is an enlarged section on the line 3—3 of Fig. 2.

Figure 1:
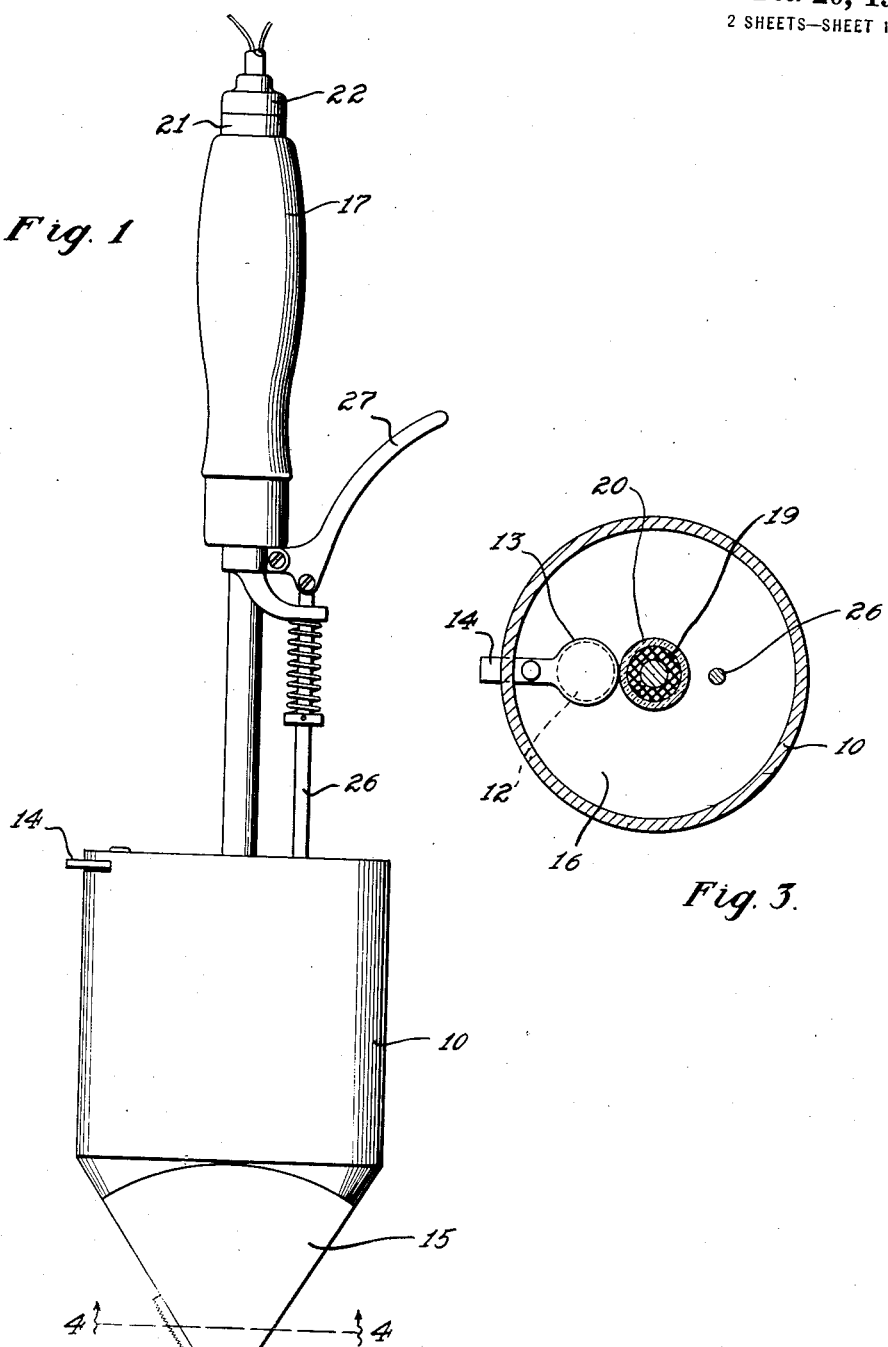
Figure 1 is a side elevation of a soldering iron constructed in accordance with the invention.
Figure 2:
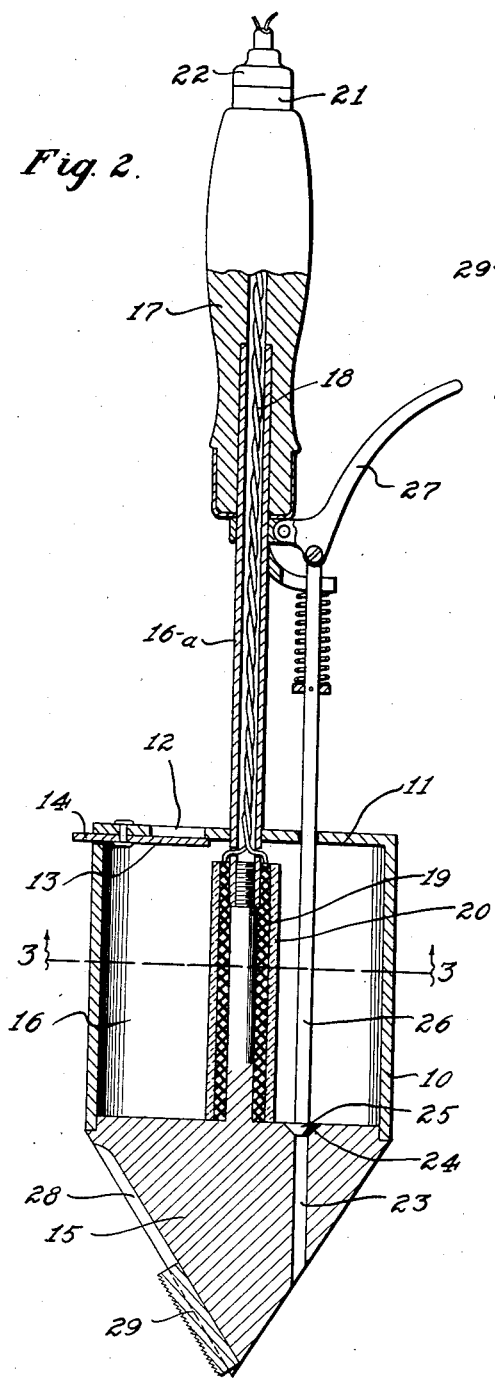
Fig. 2 is a central vertical sectional view of the same.
Figure 4:
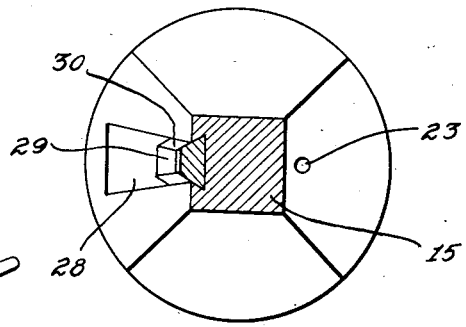
Fig. 4 is a similar view on the line 4—4 of Fig. 1.
Figure 5:
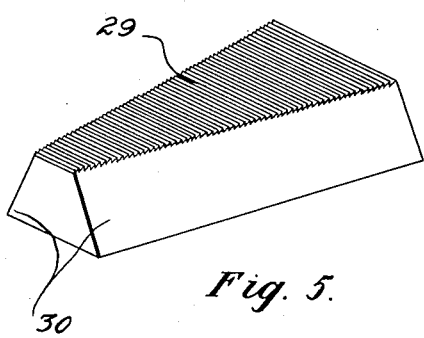
Fig. 5 is a detail perspective view of the file.

Referring to the drawings in detail, wherein like characters of reference denote corresponding parts, the reference character 10 indicates the body portion of the iron which is of hollow formation and is preferably made of copper or other material which may be readily heated. One end of the hollow body is closed as indicated at 11 and is provided with a filling opening 12, the latter being closed by a cover 13 which is movable through the medium of a lever 14 so as to open and close the opening. The opposite end of the body 10 is provided with a solid pointed extremity 15 which is preferably formed of the same material as the hollow portion of the body and acts as a closure for this end so as to provide a reservoir or chamber 16 for the reception of solder.

Secured to the body 10 is a hollow handle 16ª which terminates in a hand grip 17, conductor wires 18 passing inward through the hollow handle and being connected to a heating coil 19 located within the reservoir or chamber 16. This heat coil is surrounded by an insulating sleeve 20, which is preferably formed of porcelain and when current passes through this coil, the solder which is inserted through the opening 12 will be melted and the iron heated as will be readily apparent. The extremity of the hand grip 17 is provided with a socket 21 to which the wires 18 are connected, the said socket being adapted to receive a plug 22 which may be connected to a suitable source of current.

The pointed end 15 of the body 10 which forms the soldering point is provided with an opening or passage 23 for the discharge of melted solder from the chamber 16, the inner end of this passage being provided with a valve seat 24 for the reception of a valve 25. Connected to the valve is a stem 26 which extends outwardly through the closed end 11 of the body and is connected to a spring actuated valve operating lever 27 which is pivotally mounted upon the handle 16.

Current passing through the coil 19 will heat the iron and melt the solder and by pressing the lever 27 inward toward the hand grip 17, the valve 25 will be lifted from its seat so as to permit solder to flow through the discharge opening or passage 25. When a sufficient amount of solder has been discharged, its flow may be cut off by simply releasing the lever 27.

For the purpose of providing convenient means for smoothing the work when necessary, the soldering point 25 is provided with upwardly and outwardly flared grooves 28 which extend from the extremity of the soldering point 15, the said grooves providing means for detachably securing a file 29. This file is of tapered formation and is substantially V-shaped in cross section, the edges of the inwardly inclined walls 30 engaging in the grooves 28 so as to frictionally hold the file in position. The latter may be removed when desired by a slight tap on its inner end.

The invention is susceptible of various changes in its form, proportions and minor details of construction and the right is herein reserved to make such changes as properly fall within the scope of the appended claim.

Having described the invention what is claimed is:—

A soldering iron comprising a hollow member closed at each end and provided with a filling opening at one end and a soldering point at its opposite end and defining a solder container, said soldering point having a discharge opening therein, a handle secured to the hollow member, a valve for controlling the discharge opening, a valve stem extending from the valve, a spring actuated operating lever secured to the handle and connected to the valve stem for operating said valve and a heating element within the hollow member.

In testimony whereof I affix my signature.

CHARLES B. ARCHER.